Dec. 4, 1928.

M. J. FORRESTER 1,694,007

DOUBLE DECK PASSENGER VEHICLE

Filed Sept. 11, 1925   5 Sheets-Sheet 1

INVENTOR.
M. J. Forrester
BY
Rogers, Kenney, Campbell
ATTORNEYS.

Dec. 4, 1928.

M. J. FORRESTER 1,694,007

DOUBLE DECK PASSENGER VEHICLE

Filed Sept. 11, 1925   5 Sheets-Sheet 3

INVENTOR.
M. J. Forrester
BY Rogers, Kennedy Campbell
ATTORNEYS.

Dec. 4, 1928.

M. J. FORRESTER 1,694,007

DOUBLE DECK PASSENGER VEHICLE

Filed Sept. 11, 1925  5 Sheets-Sheet 4

INVENTOR.
M. J. Forrester
BY
Rogers, Kennedy Campbell
ATTORNEYS.

Dec. 4, 1928.
M. J. FORRESTER
1,694,007
DOUBLE DECK PASSENGER VEHICLE
Filed Sept. 11, 1925   5 Sheets-Sheet 5
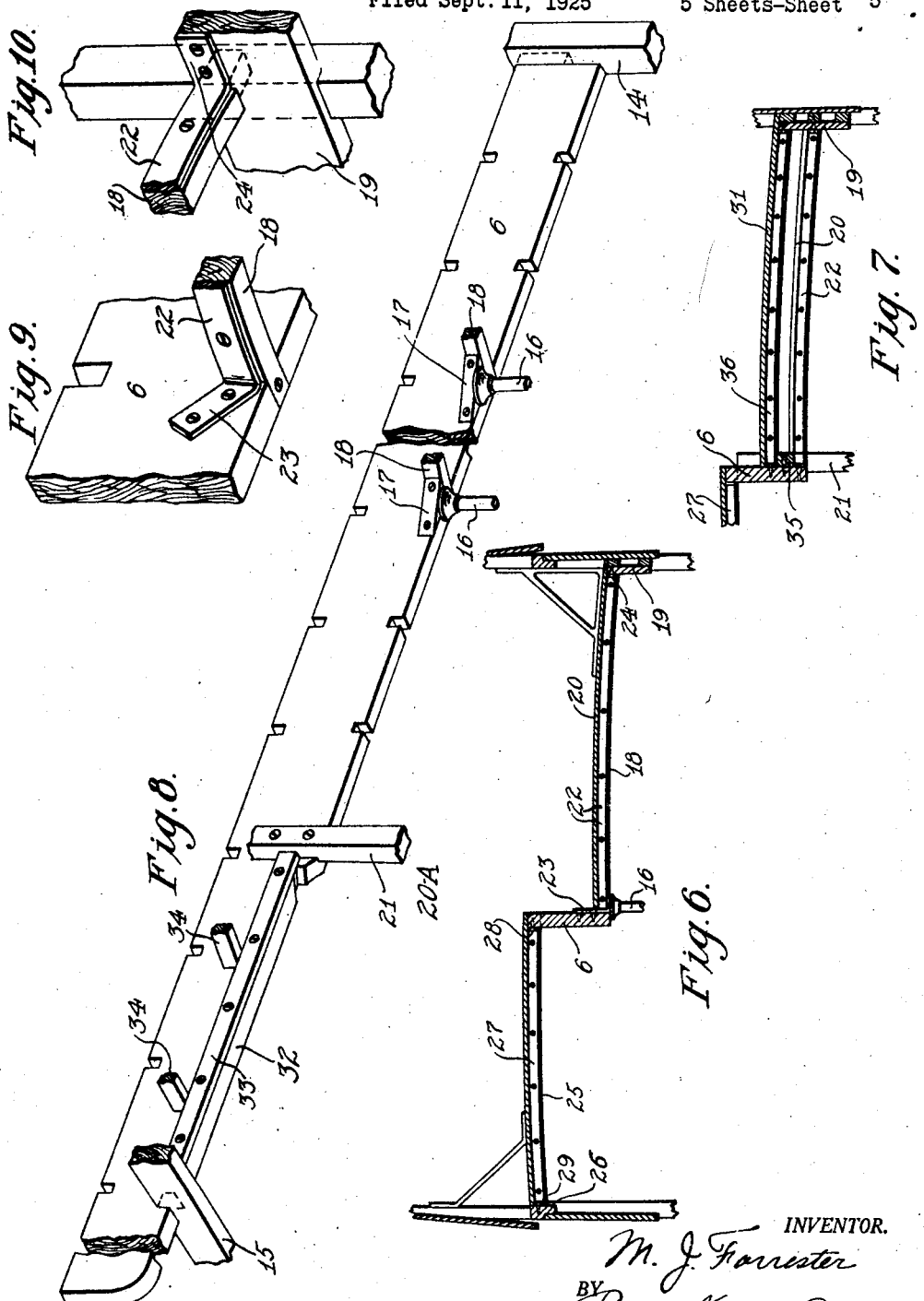
INVENTOR.
M. J. Forrester
BY Rogers, Kennedy Campbell
ATTORNEYS.

Patented Dec. 4, 1928.

1,694,007

UNITED STATES PATENT OFFICE.

MICHAEL J. FORRESTER, OF ASTORIA, NEW YORK, ASSIGNOR TO FIFTH AVENUE COACH COMPANY, A CORPORATION OF NEW YORK.

DOUBLE-DECK PASSENGER VEHICLE.

Application filed September 11, 1925. Serial No. 55,659.

This invention relates to passenger carrying vehicles or buses, and more particularly to motor buses of the double-deck type which possess the maximum seating capacity. Such buses have been provided, as a protection to the passengers in inclement weather, with a top for the upper deck, which top, by the provision of curtains or windows, could be opened or closed according to the condition of the weather. But in order to give headroom to the passengers in traversing the decks, the overall height of these buses has been such as to prevent their use on certain routes, more particularly in cities where elevated railroads, bridges, trees and other over-head obstructions are so low as to prevent the passage of the vehicle thereunder.

It is the aim of the present invention to construct a double-deck bus with a protective top, which bus will be of such reduced height overall, that, while the passengers will be afforded the necessary headroom in traversing the decks, yet the bus will be enabled to pass beneath such over-head obstructions as are enumerated above as commonly existing in cities; and to this end the invention consists in the improved construction of the bus and the form and arrangement of the parts thereof, which will be fully described in the detail description to follow, and the novel features of which will be set forth in the appended claims.

In the accompanying drawings:

Fig. 6 is a transverse section through the upper deck on the line 6—6 of Fig. 2, looking rearwardly;

Fig. 7 is a similar view on the line 7—7 of Fig. 2;

Fig. 8 is a perspective view of fore and aft member for strengthening and bracing the bus structure, and of certain parts associated therewith;

Figs. 9 and 10 are fragmentary perspective views of certain details of the bus structure.

Figure 1:
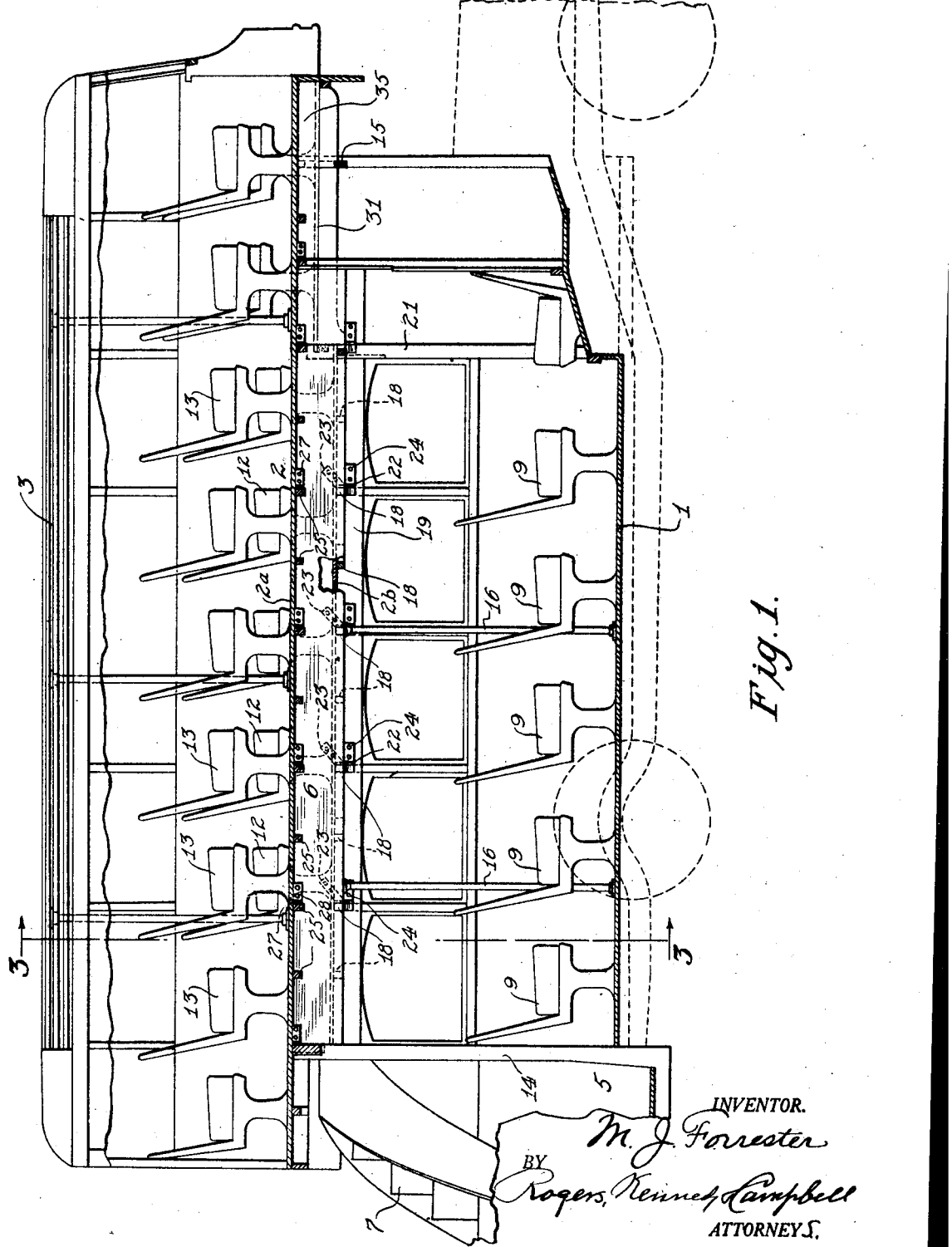
Fig. 1 is a longitudinal sectional elevation of a bus having my invention embodied therein.
Figure 3:
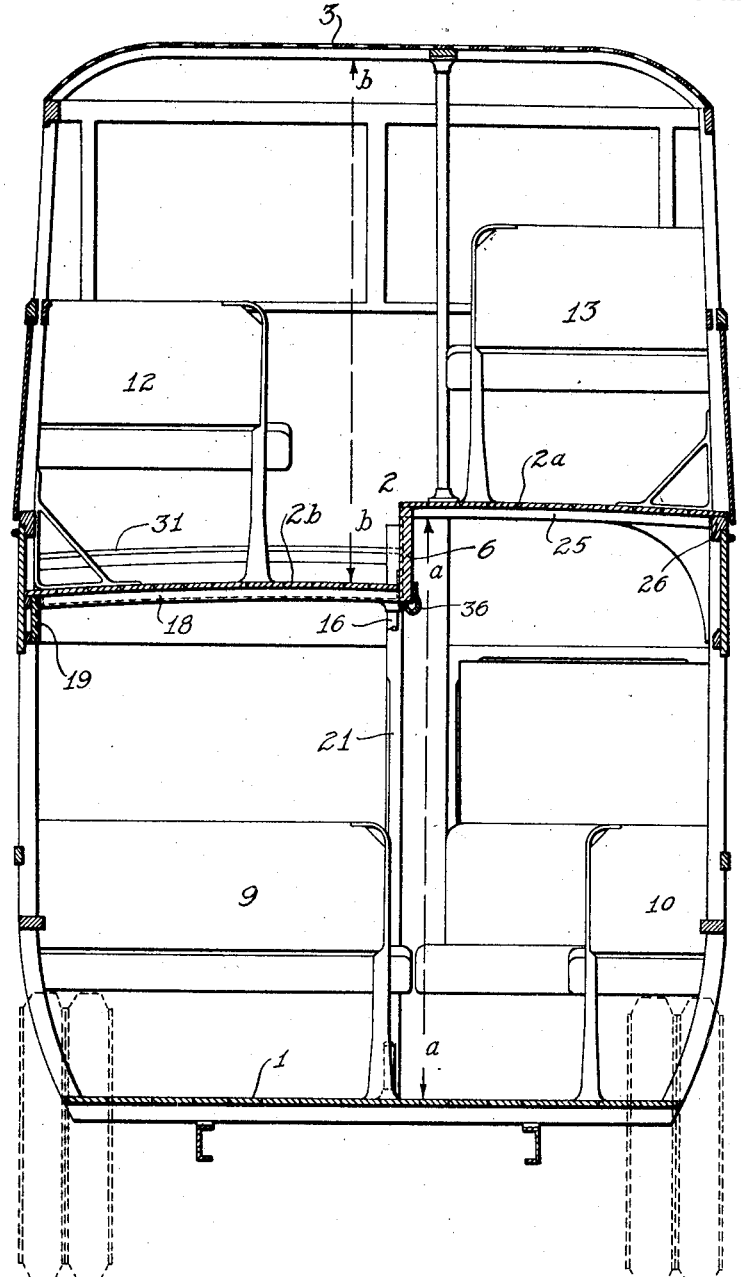
Fig. 3 is a transverse sectional elevation on the line 3—3 of Fig. 1, looking forwardly.
Figure 4:
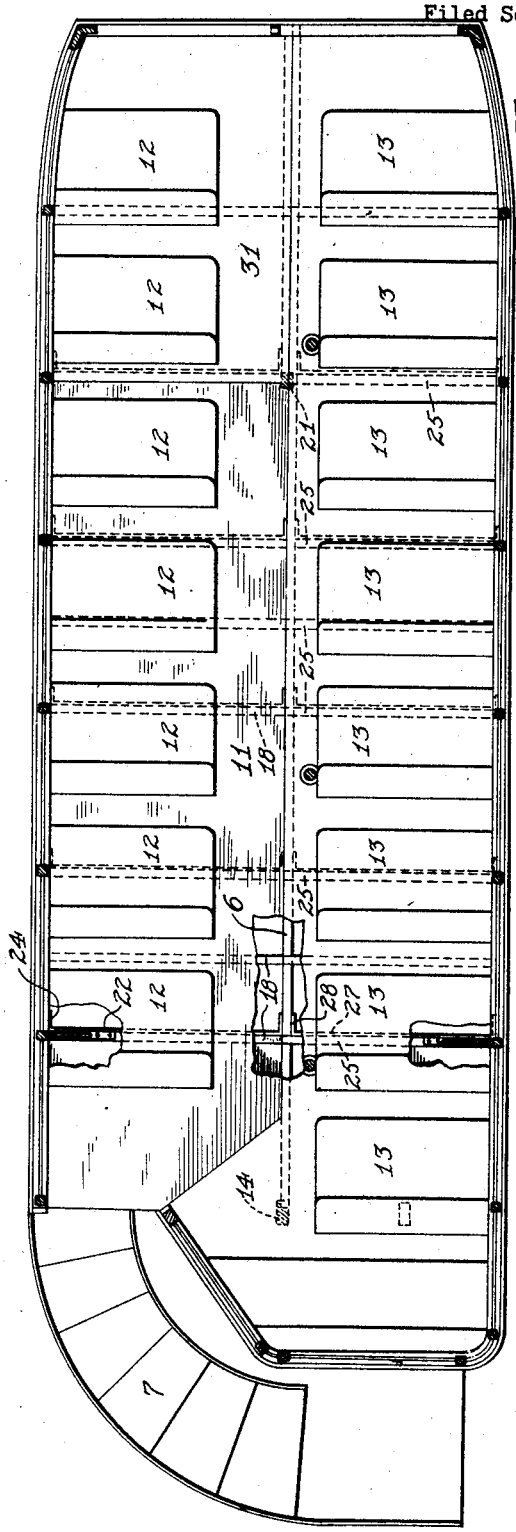
Fig. 4 is a sectional plan view of the upper deck of the bus.

Referring to the drawings:

The improved bus is formed with a lower deck or floor 1, an upper deck or floor 2 disposed thereover, and a cover or top 3 arranged over the upper deck and serving to enclose the same and protect the passengers in inclement weather. The lower deck is arranged in one level or plane, as best shown in Fig. 3, and entrance is had to the same through a doorway 4 disposed at the rear of the bus near one side of the same, and affording communication between the usual vestibule 5 and the interior of the bus. The upper deck is in two sections or floors disposed respectively at different levels, an upper section $2^a$ extending fore and aft for the full length of the bus, and a lower section $2^b$ extending fore and aft for nearly the full length, which two sections join each other in a vertical supporting member 6 which extends the full length of the bus structure between the inner adjacent edges of the two sections as will be more fully described in detail later on. In the form of the invention illustrated, the upper deck section $2^a$ is somewhat less in width than that of the lower section, and extends over that side of the lower deck which is entered by the doorway 4, so that the passengers on the entrance side of the lower deck are afforded the maximum extent of headroom represented by the vertical distance $a—a$ between the lower deck and the upper section of the upper deck.

Access to the upper deck is afforded by the usual rear stairs 7 leading from the vestibule to the outer side of the lower section of the upper deck at its rear end, and the passengers leaving the stairway enter directly onto this lower section, and are therefore afforded the maximum extent of headroom represented by the vertical space $b—b$ between the floor of the lower section $2^b$ and the roof of the bus top.

Figure 5:
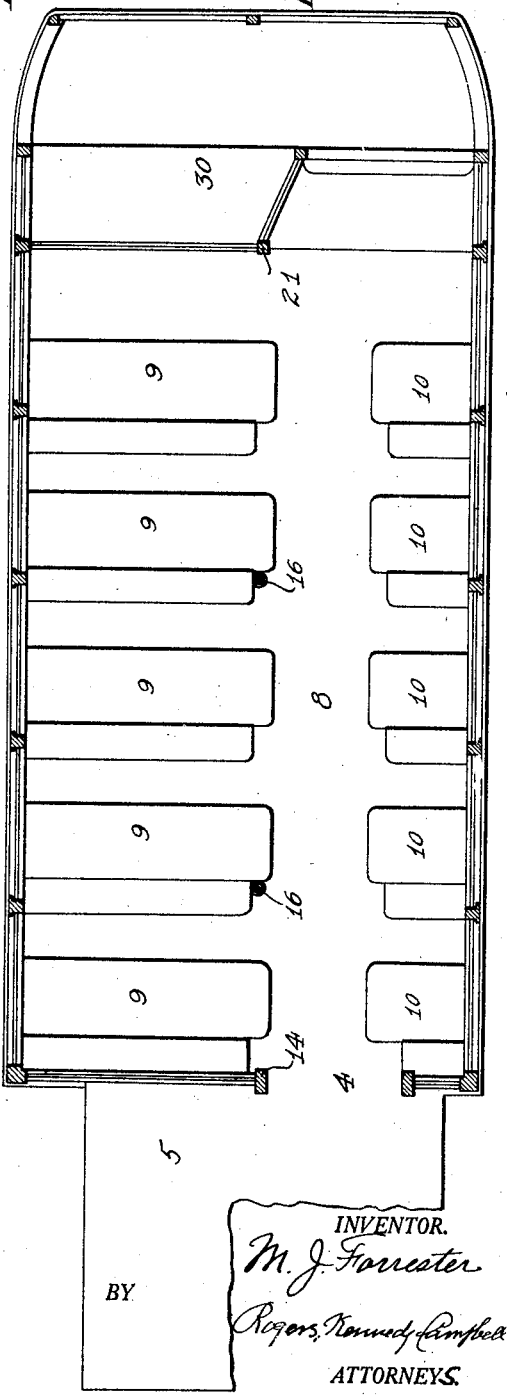
Fig. 5 is a similar view of the lower deck.

The entrance door for the lower deck is at the rear end of a longitudinal aisle 8 extending between two rows of transversely arranged forwardly facing seats 9 and 10, as shown in Fig. 5; and the passengers entering the upper deck from the stairway pass diagonally foward from the rear end of the lower section of the upper deck to the rear end of a longitudinal aisle 11 between two rows of transversely arranged forwardly facing seats 12 and 13, as shown in Fig. 5, the two aisles being thus juxtaposed to each other and disposed respectively on opposite sides of the vertical plane of the longitudinal member or wall 6, with the upper portion of the vertical space between the lower deck and the upper section of the upper deck, overlapping the lower portion of the vertical space between the lower section of the upper deck and roof of the top 3.

The effect of this overlapping relation of the vertical spaces through which the passengers pass in traversing the two aisles is to reduce the overall height of the bus without reducing the headroom in the aisles, so that without discomfort to the passengers in entering the two decks and passing to their seats, I am enabled to reduce the overall height of the double-deck bus to such extent that it can pass beneath such over-head obstructions as would prevent the passage of a bus of greater height.

An important feature of the invention is the longitudinal member 6 which, as before described, extends vertically between the adjacent edges of the two sections of the upper deck. This member is of such form and construction and is so incorporated in the bus structure that it acts to strengthen and brace the same and gives solidity and stiffness to the structure as a whole, and protects the same against stresses which would otherwise result in dangerous and injurious strains of the structure. The form of this member and the manner in which it is incorporated in the bus structure will now be described.

As best shown in Fig. 8, this strengthening member is in the form of a longitudinal beam which is fixed to and is supported at its rear by a vertical frame member or post 14 fixed in the rear end of the bus structure and constituting the inner frame of the doorway 4. In the present instance, the end of the beam is fixed to the post by tenoning the beam therein, but it will be understood that other forms of construction may be adopted which will give the beam firm support on the post. At its forward end the beam is supported by a horizontal bar 15 extending transversely of and fixed in the bus structure near the front of the same, the said bar being shown as mortised in the beam, although other forms of connection of the parts may be resorted to. Between its ends the beam is given firm support from the lower deck by means of posts 16 disposed in the aisle 8, the upper ends of which posts seat against the under sides of triangular bracket blocks 17 fastened at their two sides respectively to the side of the beam and the sides of transverse rails 18. These rails are mortised at their inner ends on the lower edge of the beam, and are mortised at their outer ends in a bar 19 extending longitudinally of and fastened to the side of the bus structure. These transverse rails, and others of the same form and similarly supported, give support to the floor of the lower section 2ᵇ of the upper deck which floor is fastened down on the rails. Between the forward post 16 and the horizontal bar 15, the longitudinal beam is further supported by means of a vertical supporting post 21 fixed in the bus structure near the front, in the side of which corner post at its upper end, the longitudinal beam is mortised, as best shown in Fig. 8. The transverse rails 18 above referred to, are firmly fastened at their inner ends to the lower edge of the longitudinal beam, and at their outer ends to the fore and aft bar 19, as above described, and these rails are disposed at intervals throughout the length of the longitudinal beam, and support the floor as above mentioned.

In order to effect a stiff and rigid connection between the rails 18 and the parts to which their ends are connected, as well as to strengthen and reinforce the rails themselves, carlines 22 in the form of metal strips are secured to the sides of the rails and are bent upwardly at their inner ends as at 23, and fastened to the side of the longitudinal beam, as shown in Figs. 6 and 9. At their outer ends these strips are bent laterally as at 24, and are fastened to the side of the bar 19, see Fig. 10. The flooring of the upper section 2ᵃ of the upper deck is similarly fastened to and supported by transverse rails 25 which are disposed at intervals between the upper edge of the longitudinal beam and the side of the bus structure, which rails are mortised at their inner ends in the upper edge of the longitudinal beam, and at their outer ends in a fore and aft bar 26 extending along the side of the bus and fixed thereto, the said rails being reinforced by carlines 27 in the form of metal strips which are screwed to the side of the rails and bent laterally at their ends, and the bent ends fastened respectively to the side of the longitudinal beam and the side of the fore and aft bar 26, as at 28 and 29 respectively (see Fig. 6). These strips, in addition to strengthening and reinforcing the rails, effect a firm and rigid connection between the rails and the longitudinal beam and side of the bus.

Figure 2:
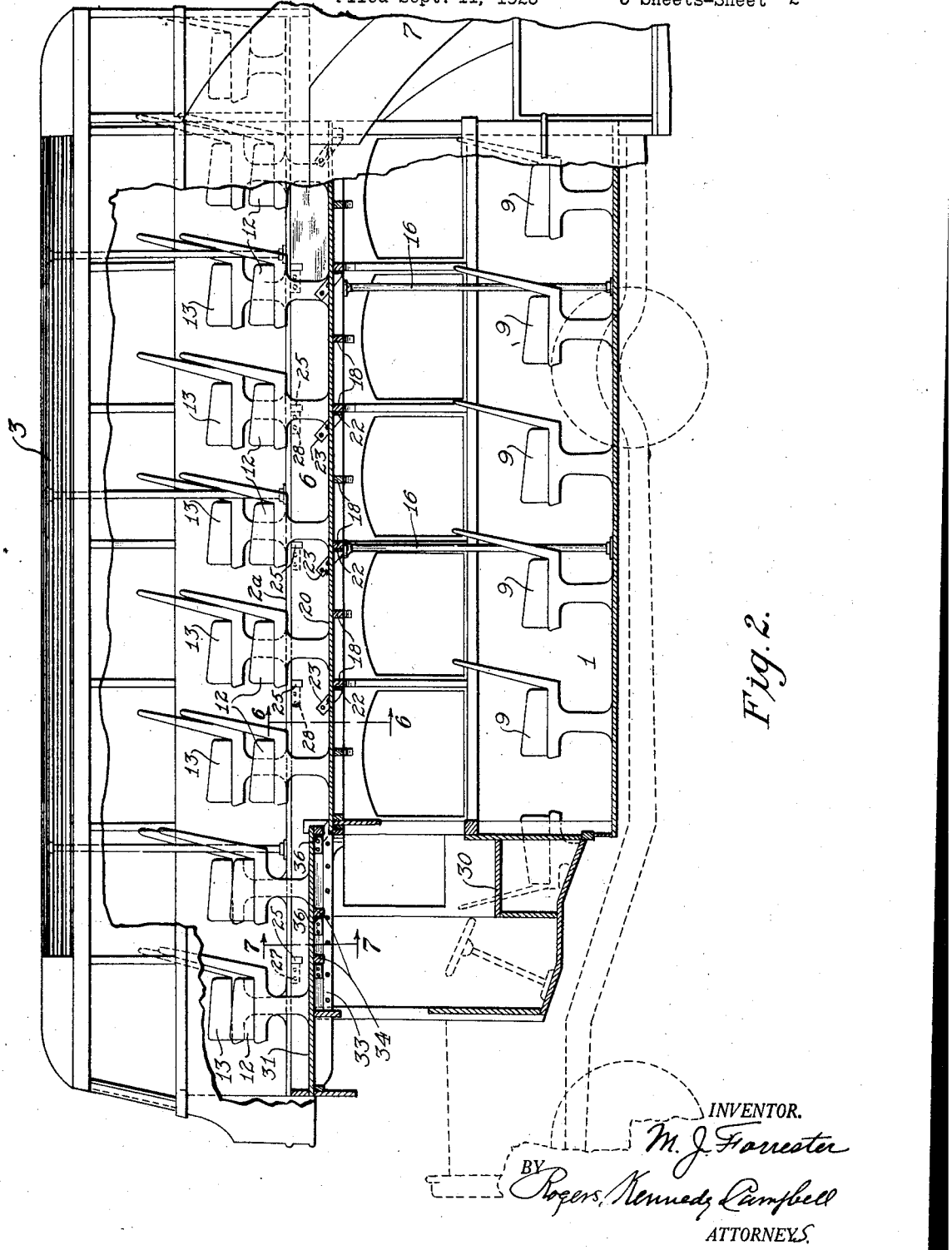
Fig. 2 is a similar view looking from the opposite side of the bus.

The driver's seat, designated by the numeral 30, is at the front of the vehicle on the lower deck at the left hand side, as shown in Fig. 2, and 5 is disposed beneath the front portion of the lower section 2ᵇ of the upper deck, and in order that the driver occupying the seat will have sufficient headroom, notwithstanding the lower level of the deck section 2ᵇ thereover, the front portion of this deck section is raised above the general level of its rear portion, as indicated at 31 in Fig. 2. To effect this object, the lower portion of the longitudinl beam 6 is cut away as at 32 (see Fig. 8) and a horizontal plate 33 is fastened to the side of the beam along the lower edge of the cut away portion, on which plate the inner ends of horizontal transverse supporting rails 34 rest. These rails extend to the side of the bus structure and are fastened to a fore and aft extending bar 35 fixed thereto. The rails 34 are reinforced and their firm connection with the horizontal beam and with the bar 35, is effected by means of carlines 36 in the form of metal strips which are fastened to the sides of the rails and are bent laterally at their ends and fastened respectively to the longitudinal beam and to the bar 35.

As shown in Fig. 5, the seats 9 occupying the wide space to the left of the aisle on the lower deck, are of a width to accommodate three passengers each, while those in the relatively narrow space on the opposite side of the aisle will accommodate but one person each, so that notwithstanding the fact that the aisle is offset, there is no reduction in the seating capacity of the lower deck. The same is true of the upper deck, the lower section $2^b$ being sufficiently wider than the upper section, to give room for the aisle 11 and at the same time accommodate a row of double seats substantially similar to those on the upper section on the opposite side of the aisle.

In order to prevent discomfort or injury to the passengers in the event of their heads coming in contact with the lower edge of the beam when passing from the aisle to the seats 9 beneath the lower section $2^b$ of the upper deck, a yielding buffer member 36 is applied to the lower edge of the beam, which member in the present instance is in the form of a leather strip secured at its edges respectively to the side and under surface of the beam and bulged between its edges so as to yield.

In the accompanying drawings and foregoing description, I have set forth my invention in the particular detailed form and relation of parts which I prefer to adopt and which in practice have been found to answer to a satisfactory degree the ends to be attained. It will be understood, however, that these details may be variously changed and modified within the scope of the invention, and that the invention is not limited to any particular form or construction of parts except in so far as such limitations are specified in the claims.

Having thus described my invention, what I claim is:

1. In a bus, the combination of a lower deck, a driver's seat at the front of the same, and an upper deck formed of two sections disposed at different levels and extending longitudinally respectively on opposite sides of a vertical plane, the forward portion of the lower section of said upper deck extending over the driver's seat and being disposed at a higher level than its rear portion to give added headroom to the driver.

2. In a bus, the combination of a lower deck, a driver's seat at the front of the same, a longitudinal beam extending over the lower deck and having its forward portion recessed in its under side, and an upper deck comprising two sections disposed at relatively different levels respectively on opposite sides of the longitudinal beam and receiving support therefrom, the lower section of said upper deck extending at its front over the driver's seat and having its front portion supported at its inner side along the cut-away portion of the beam; whereby the forward portion of said lower section will be disposed at a higher level than its rear portion to afford added headroom for the driver.

3. In a bus, the combination of a lower deck, an upper deck comprising two deck sections disposed at different levels and extending longitudinally respectively over the opposite sides of the lower deck, a longitudinal member fixed in the bus structure, and extending between the adjacent edges of said deck sections, a row of passenger seats on the lower deck disposed beneath the lower section of the upper deck, and a yielding buffer member extending along the junction of the longitudinal member with said deck section.

In testimony whereof, I have affixed my signature hereto.

MICHAEL J. FORRESTER.